April 26, 1960 N. M. EMSLIE ET AL 2,934,394

TAPE HANDLING APPARATUS

Filed Oct. 17, 1958

INVENTORS
NORMAN M. EMSLIE
RAYMOND E. KRONENBITTER
BY Carl H. [signature]
AGENT

United States Patent Office 2,934,394

Patented Apr. 26, 1960

2,934,394

TAPE HANDLING APPARATUS

Norman M. Emslie, Yardley, and Raymond E. Kronenbitter, Philadelphia, Pa., assignors to Philco Corporation, Philadelphia, Pa., a corporation of Pennsylvania Application October 17, 1958, Serial No. 767,945

6 Claims. (Cl. 346—74)

The present invention has to do with tape handling apparatus. While of broader applicability, apparatus of the present invention has particular utility in the art of recording and reproducing equipment utilizing a ribbon or tape as a record medium.

Apparatus of the general type with which the present invention is concerned is well known in the art. Such apparatus may, for example, be provided for manipulation of magnetic tape which serves as a memory medium for computers, and in such an application it is known to handle tapes hundreds of feet in length, and propelled many feet per second past suitable recording and reproducing head means. Also, in the computer art, random predetermined portions of recording tape must be accessible to the transducing head. For example, a particular portion of the tape may have to be rewound in order to re-read particular information. To this end it has been known to provide tape-actuated signal devices. One such means, for example, includes pneumatic control apparatus operable by a perforation in the tape. In apparatus of this type a predetermined pressure normally is maintained by covering a port communicating with a pressurized portion of the apparatus by a non-perforate portion of the tape, and registry of the tape perforation with the mentioned port effects a change in pressure thereby to operate a suitable switching mechanism for controlling the tape handling apparatus.

It has also been known to provide, on the tape, a raised surface portion which is so arranged as to operate switch means for effecting a desired control function.

Keeping in mind the foregoing, it is further to be recognized that in the computer art a source of data often may comprise a number of tape handling devices. In such event it becomes imperative that maintenance shut-downs of any one or more of such devices be kept to a minimum. However, during rapid handling of great lengths of tape, there arise difficulties in maintaining the recording and reproducing heads free of contamination due, for example, to accumulations of foreign matter such as dust particles, lint, and the like. Also, due to abrasion, magnetic material is removed from the tape and this material has a tendency to accumulate at the aforementioned heads. Accumulations of the aforesaid type interfere with proper operation of the recording and reproducing circuits and, heretofore, have required that a device be shut down to clean the head.

Accordingly, it is an object of the invention to provide cleaning means that minimizes the need for shutting down the apparatus to clean portions thereof.

It is another object of the present invention to provide, in apparatus for handling a record medium, novel means for providing both a switching function for the apparatus and a cleaning function for the transducing heads associated with such apparatus.

A still further and more detailed object of the invention is to provide, in recording and reproducing apparatus, novel means for cleaning recording and reproducing heads.

In the achievement of the foregoing and other objectives a preferred embodiment of the invention comprises, for use in apparatus for moving a record tape past suitable head means—preferably a magnetic transducer—tape means including a modified area adapted to clean such head means during operation of such apparatus. The aforesaid modified area preferably comprises a suitable coating of flock-like material applied directly to the tape means. It is an important feature of the invention that the coating of flock-like material is so disposed as to operate switching means for controlling such apparatus.

For a more complete understanding of the present invention, reference may be had to the accompanying drawing in which.

Figure 1:
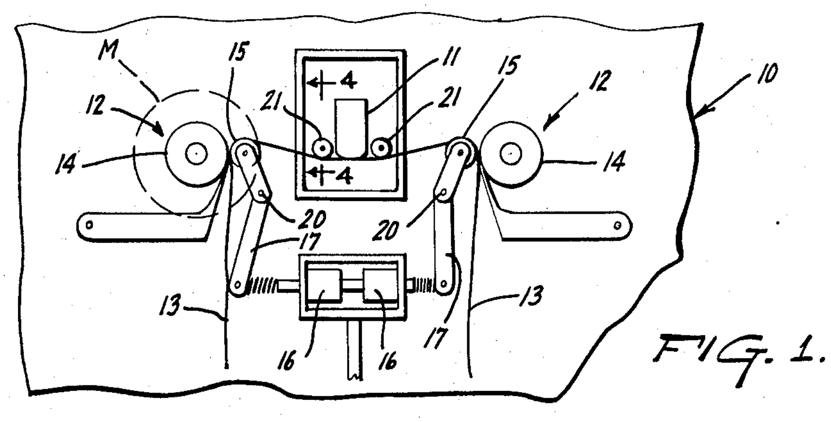
Figure 1 is a somewhat diagrammatic, front elevational view, with parts broken away, of tape handling apparatus embodying the principles of the present invention.

Now making more particular reference to the drawing, the present invention is embodied in endless tape magazine structure preferably of the type utilized as a memory medium for electrical computing equipment (not shown). Apparatus of the type to which the present invention is particularly adapted is disclosed and claimed in the patent application of Norman M. Emslie and Burnham E. Stone, entitled "Tape Handling Apparatus," Serial No. 679,337, filed August 21, 1957, and assigned to the assignee of the present invention.

As seen in Figure 1, a vertically extending wall structure 10 serves as a support plate for combined recording reproducing head means 11. Also disposed in the upper region of the support plate are a pair of drive pulley means 12 so constructed and arranged as to drive tape 13 past the aforementioned head means 11. Means for driving pulley means 12 includes a motor M adapted to drive the pulleys 14 simultaneously, and each in opposite directions, by suitable means (not shown) disposed in driving relation with drive pulleys 14.

The illustrated tape 13 may be of any known type suitable for magnetic recording, an example being a tape comprising a flexible non-metallic body portion suitably treated, for example with a coating of magnetic oxide. The coating is adherent to a surface portion of the tape, and causes the latter to exhibit the desired magnetic properties. A material known commercially as Mylar, a polyester film, has been found suitable for the aforementioned body portion.

Pulley means 12 may be and preferably are of the well known pinch-drive variety and include a drive pulley 14 and resiliently urged pressure roller means 15. A pair of such drive means is shown, each of the illustrated pressure roller means being engageable with the tape 13 whereby the latter may be frictionally driven in either direction. A pair of selectively actuatable electrical solenoid means 16 are resiliently linked to lever arms 17, the latter being pivotally mounted, as seen at 20, and adapted to actuate the pressure roller means 15 in order selectively to provide the required driving engagement with each pulley 14.

Figure 2:
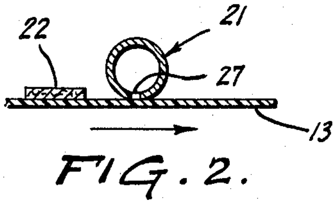
Figures 2 and 3 are enlarged, fragmentary, sectional views of apparatus illustrated in Figure 1.
Figure 3:
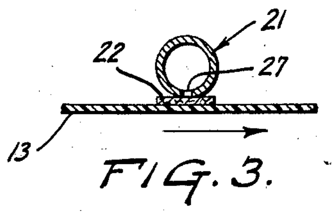
Figure 4:
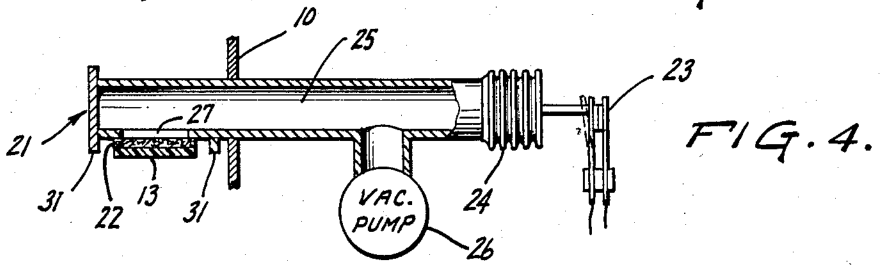
Figure 4 is a somewhat diagrammatic view, partly in section, and looking in the direction indicated by arrows 4—4 as applied to Figure 1.

As seen to advantage in Figures 2, 3 and 4, guide means for the tape includes a pair of vacuum tensioning means 21 of known type suitably disposed on either side of the transducing head means 11 and providing proper tensioning of the recording tape over the head means.

Figure 5:
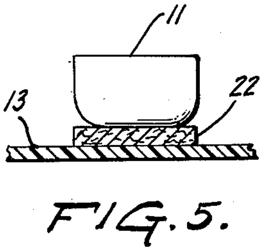
Figure 5 is a still further enlarged sectional view of apparatus illustrated in Figure 1.

In particular accordance with the present invention, and referring additionally to Figure 5, an area of the tape's magnetic surface, which is presented toward the recording and reproducing head, is provided with a thickened portion or projecting coating, for example a coating of adherent soft fibers 22, such as a cotton flock. While the relative thicknesses of the adherent fibers and the tape are not shown to scale in the drawing, in order better to illustrate the invention, it will be understood that the thickness of the flock 22 will be of such magnitude as to provide a substantially porous mass of fibers. These fibers also advantageously have sufficient rigidity that, upon moving across the recording-reproducing head means 11 (Figure 5), they bear against the latter with sufficient force to clean the same. The flock may be applied by any one of known suitable means available in the art. It is also to be understood that, within the teaching of the present invention, it is contemplated that the term "flock" connote other suitable fibrous materials of a porous nature, for example felt, velvet, or the like. Also, it is contemplated that a relatively short section of flock-coated tape may be provided, said section being adapted for insertion, by splicing, into a still longer recording tape.

As best seen in Figure 4, control of the tape handling apparatus is effected through operation of a suitable switch means 23 which is coupled to the pinch drive means 12, in such manner as selectively to operate the same, by any one of known suitable means (not shown) available in the art and not forming a part of the present invention. Operation of switch means 23 is effected in response to actuation of a bellows 24 in fluid flow communication with a vacuum chamber 25 and a vacuum pump 26. Vacuum chamber 25 is also disposed in fluid flow communication with vacuum tensioning means 21, the latter having a slot 27 presented toward the tape and normally being substantially covered by the latter. The vacuum tensioning means also includes flanges 31 which guide the tape and prevent the latter from inadvertently moving off the rollers 14, 15 as well as recording-reproducing head means or transducer 11.

In the operation of the aforementioned apparatus, and referring first to Figure 2, it is seen that normally the upper, magnetic particle-bearing surface of tape 13 overlies the aforementioned slot 27 thereby effectively sealing the vacuum system, and causing the bellows 24 (Figure 4) to be retracted and to hold the switch 23 in the position shown in broken lines. It is also seen that, in Figure 3 as well as the full line showing of Figure 4, registry of the flock 22 with the slot will, due to the porous nature of the flock, effect an instantaneous break in the vacuum system. The aforesaid break in the vacuum is sufficient to raise the pressure and move the bellows to its extended position, as shown in Figure 4, thereby to close the switch and actuate the control mechanism. It will be understood that there is of course provided sufficient lag in operating the control mechanism to permit flock 22 to ride over the transducing head means, as seen in Figure 5, thereby to clean the same.

Figure 6:
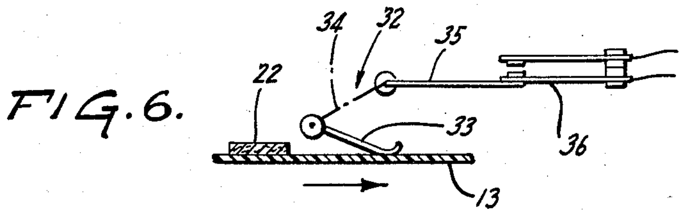
Figures 6 and 7 are views similar to Figures 2 and 3, and showing a modified embodiment of the invention.
Figure 7:
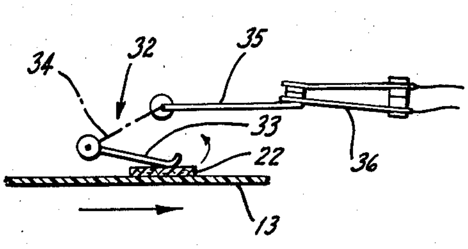

In the modified embodiment shown in Figures 6 and 7, the switch actuation is carried out by suitable mechanical linkage means 32 operable in response to passage of the body of flock 22 in contact therewith. The lever arm 33 of the linkage means is so constructed and arranged as to contact the tape 13 during normal movement of the latter. Lever arm 33 is pivotally mounted, as upon a rotatable shaft 34, and affixed to the other end of this shaft is a second lever arm 35 releasably engageable with the switch arm 36 to actuate the same, in response to pivotal movement imparted to the first mentioned lever arm 33. As best seen in Figure 7 the desired switch actuation is effected when the flock 22 engages lever arm 33, thereby rotating switch operating lever 35 into such position as to actuate the switch, for example to its closed position.

Thus it is seen that the invention not only resides in novel means for cleaning recording and reproducing heads of tape recording apparatus, but also in the combined cleaning and switch actuating means for use in tape handling apparatus. It will be understood, accordingly, that the invention advantageously provides optimum performance of recording and reproducing apparatus, while minimizing the necessity for shutting down the apparatus to clean the same.

While certain preferred embodiments of the invention have been shown, for the purposes of illustration, it will be understood that such other modifications may be made as fall within the scope of the appended claims.

We claim:

1. In tape handling apparatus: transducing head means; a tape including means carried by said tape and projecting therefrom in a direction to engage the head means; drive means providing for linear movement of said tape to effect sliding engagement of the latter with said head means, engagement of said head means by said means carried by the tape being effective to clean the head means; switch means for controlling said drive means; and means for actuating said switch means, disposed for sliding engagement sequentially with said tape and with said means carried by said tape and being operable by the latter in response to such engagement.

2. Apparatus in accordance with claim 1, and further characterized in that said means carried by said tape and projecting therefrom is of a porous nature and said last recited means includes pneumatic linkage means for operating said switch means, said linkage means having a port in fluid flow communication therewith and normally closed by said tape thereby to maintain a predetermined pressure in said pneumatic linkage means for providing one mode of operation of said drive means, registry of said tape-carried means with said port being effective partially to open the latter thereby to modify the aforesaid pressure in said linkage means and to provide a modified mode of operation of said drive means.

3. Apparatus in accordance with claim 1, and further characterized in that said last recited means includes mechanical linkage means for operating said switch means, said linkage means including a movable sensing element normally engaging said tape thereby to provide one mode of operation of said drive means, and said sensing element being disposed for engagement with said means carried by said tape to move said element and to provide a modified mode of operation of said drive means.

4. In tape handling apparatus: tape including flock applied to a predetermined region thereof; drive means providing for linear movement of said tape; transducing head means disposed for sliding engagement with said tape and said flock, the aforesaid engagement by the flock being effective to clean the head means; switch means for controlling said drive means; and means for actuating said switch means, disposed for sliding engagement sequentially with said tape and said flock and being operable by the latter in response to such engagement.

5. Apparatus in accordance with claim 4, and further characterized in that said last recited means includes pneumatic linkage means for operating said switch means, said linkage means having a port in fluid flow communication therewith and normally closed by said tape thereby to maintain a predetermined pressure in said pneumatic linkage means for providing one mode of operation of said drive means, registry of said flock with said port being effective partially to open the latter thereby to modify the aforesaid pressure in said linkage means and to provide a modified mode of operation of said drive means.

6. Apparatus in accordance with claim 4, and further characterized in that said last recited means includes mechanical linkage means for operating said switch means, said linkage means including a movable sensing element normally engaging said tape thereby to provide one mode of operation of said drive means, and said sensing element being disposed for engagement with said flock to move said element and to provide a modified mode of operation of said drive means.

References Cited in the file of this patent

UNITED STATES PATENTS

| | | |
|---|---|---|
| 2,606,409 | Gordon | Aug. 12, 1952 |
| 2,741,530 | Hill | Apr. 10, 1956 |